US009329270B2

(12) United States Patent
Krause et al.

(10) Patent No.: US 9,329,270 B2

(45) Date of Patent: May 3, 2016

(54) IMAGE-AIDED ILLUMINATION ASSEMBLY AND METHOD

(71) Applicant: Lockheed Martin Corporation, Bethesda, MD (US)

(72) Inventors: James Michael Krause, Saint Michael, MN (US); Norman August Lehtomaki, Edmonds, WA (US); Bing C. Li, Vestal, NY (US); Gregory J. Whaley, Woodbury, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 282 days.

(21) Appl. No.: 14/028,759

(22) Filed: Sep. 17, 2013

(65) Prior Publication Data

US 2015/0077558 A1 Mar. 19, 2015

(51) Int. Cl.

| | |
|---|---|
| ***G01S 17/66*** | (2006.01) |
| ***G01S 17/06*** | (2006.01) |
| ***G01S 7/481*** | (2006.01) |
| ***B60R 11/04*** | (2006.01) |
| ***H04N 5/235*** | (2006.01) |
| ***F41G 3/02*** | (2006.01) |
| ***F41G 3/14*** | (2006.01) |
| ***F41G 3/32*** | (2006.01) |

(52) U.S. Cl.

CPC ................. *G01S 17/66* (2013.01); *B60R 11/04* (2013.01); *F41G 3/02* (2013.01); *F41G 3/145* (2013.01); *F41G 3/326* (2013.01); *G01S 7/4818* (2013.01); *G01S 17/06* (2013.01); *H04N 5/2354* (2013.01)

(58) Field of Classification Search

CPC ........... B60R 11/04; F41G 3/02; F41G 3/145; F41G 3/326; G01S 17/06; G01S 17/66; G01S 7/4818; H04N 5/2354

USPC ........................................................ 348/148

See application file for complete search history.

(56) References Cited

U.S. PATENT DOCUMENTS

| | | | | |
|---|---|---|---|---|
| 4,498,038 | A * | 2/1985 | Malueg | 318/648 |
| 6,020,955 | A | 2/2000 | Messina | |
| 6,845,190 | B1 | 1/2005 | Smithwick | |
| 7,773,116 | B1 | 8/2010 | Stevens | |
| 2007/0008514 | A1 * | 1/2007 | Krasutsky | 356/4.01 |
| 2007/0205366 | A1 | 9/2007 | Gidseg et al. | |
| 2010/0034424 | A1 | 2/2010 | Goossen | |
| 2011/0268453 | A1 | 11/2011 | Fest et al. | |

OTHER PUBLICATIONS

International Search Report for PCT/US2014/055857, dated Dec. 15, 2014, 4 pages.

* cited by examiner

*Primary Examiner* — Anner Holder

(74) *Attorney, Agent, or Firm* — Reising Ethington PC

(57) ABSTRACT

An illumination assembly includes a laser for producing a laser beam of light and an optical fiber disposed adjacent the laser and extending between a beam receiving end for receiving the laser beam of light from the laser and a beam emitting end for emitting the laser beam of light therefrom. A beam splitter splits the laser beam into a target beam and a feedback beam and directs the target beam toward the targeted object. A feedback sensor receives the feedback beam and generates a feedback signal to identify a targeted image portion correlated to the targeted object. A motor is operatively connected to the vehicle with the beam emitting end fixedly secured thereto. A controller receives the feedback signal generated by the feedback sensor and generates a control signal transmittable to the motor to position the beam emitting end of the optical fiber such that the target beam continues to be directed toward the targeted object.

13 Claims, 4 Drawing Sheets

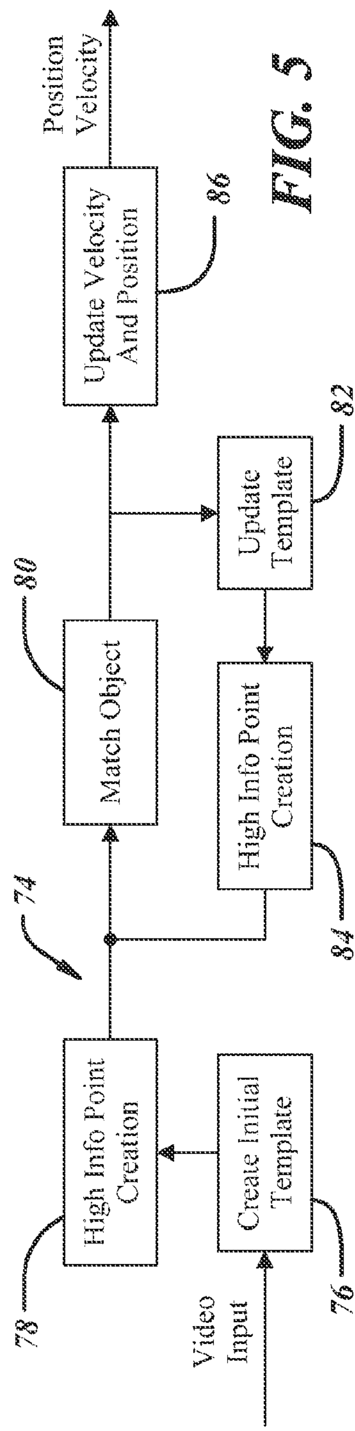
FIG. 5
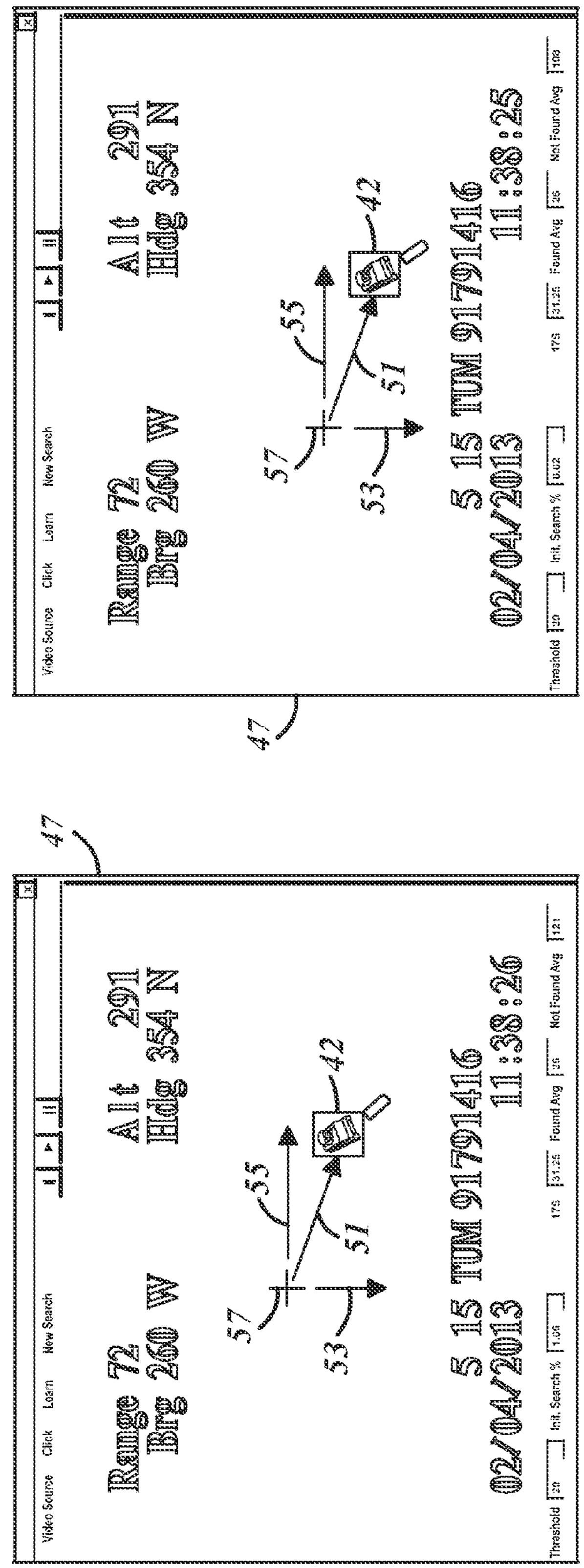
FIG. 6A
FIG. 6B

IMAGE-AIDED ILLUMINATION ASSEMBLY AND METHOD

BACKGROUND

1. Field

This application relates generally to vehicle-mounted illumination systems to identify and target an object.

2. Description of Related Art Including Information Disclosed Under 37 CFR 1.97 and 1.98

Lasers are mounted to vehicles, e.g., land vehicles, watercraft and aircraft, to designate or illuminate targets. While illuminating or designating a target, the vehicle may track the targeted object as that targeted object moves. The targeted object may be the subject of surveillance or the subject of targeting. In the situation where the vehicle hosting the laser illuminating system is small, the vehicle is more likely to be effected by its environment. By way of example, an unmanned air vehicle (UAV) is a small vehicle that is affected by wind gusts much more so than a larger UAV or a larger manned vehicle. And because the small UAV is less stable and has higher angular body rates in wind, it cannot effectively point a laser beam steadily on a target. The UAV itself cannot be sufficiently stabilized due to the limited control effectiveness of the controlling surfaces of the UAV.

Gimbal stabilization is an option for stabilizing an illumination system on a target. Gimbals are, however, heavy, requiring strong motors and a large power consumption—neither of which are available on a small UAV.

SUMMARY

An illumination assembly is adapted to be mounted to a vehicle for targeting an object. The illumination assembly comprises a laser for producing a laser beam of light, and an optical fiber disposed adjacent the laser and extending between a beam receiving end for receiving the laser beam of light from the laser and a beam emitting end for emitting the laser beam of light therefrom. A beam splitter is disposed adjacent the beam emitting end of the optical fiber and is configured to split a laser beam of light produced by the laser, into a target beam and a feedback beam and to direct the target beam toward the targeted object. A feedback sensor is configured and positioned to receive the feedback beam and to generate a feedback signal to identify a targeted image portion correlated to the targeted object. A motor is operatively connected to the vehicle with the beam emitting end fixedly secured thereto. The assembly also includes a controller for receiving the feedback signal generated by the feedback sensor and for generating a control signal transmittable to the motor to position the beam emitting end of the optical fiber such that the target beam continues to be directed toward the targeted object.

DRAWING DESCRIPTIONS

FIG. 5 is a block diagram of the image processing system;

FIGS. 6A and 6B are graphic representations of a targeted object as viewed through a camera employed by the invention.

DETAILED DESCRIPTION

Figure 1:
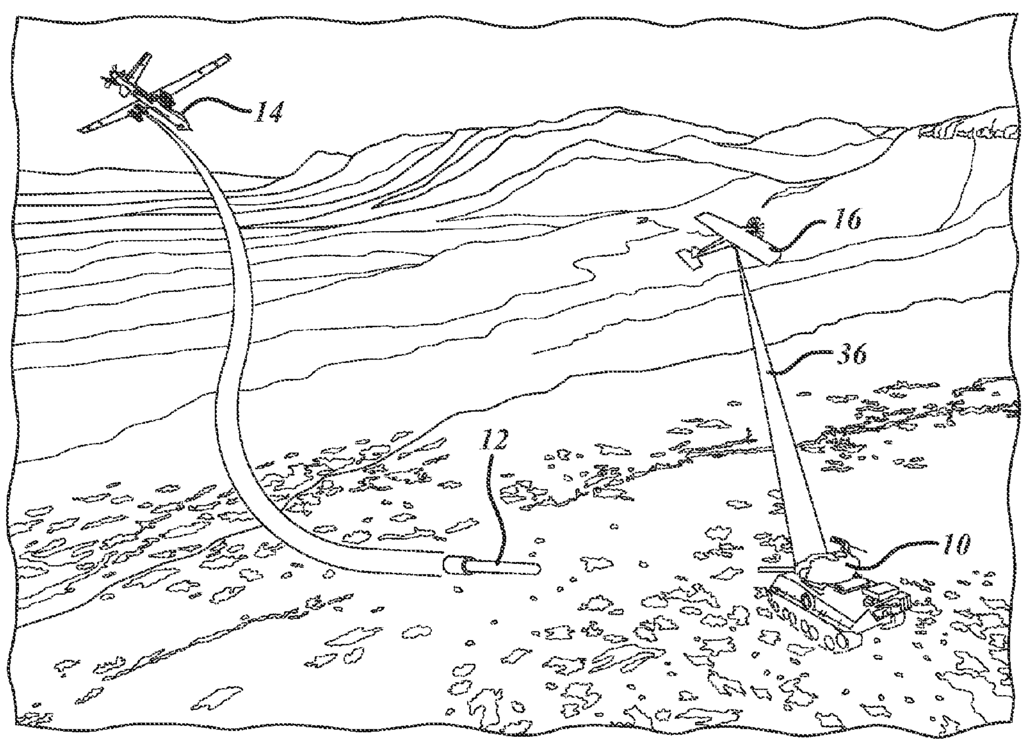
FIG. 1 is a perspective environmental view of a vehicle hosting an illumination assembly.

A general landscape is depicted in FIG. 1. An object 10 to be targeted is shown to be a tank traveling across the landscape. The targeted object 10 may, of course, be any object that is the subject of targeting or surveillance. In the example shown in FIG. 1, the object 10 is targeted for destruction by a missile 12 that is fired from another vehicle 14, typically heavier and capable of the payload requirements of the missile 12. In order for the missile 12 to reach the object 10, the object 10 must be targeted. With the aid of the invention, a light vehicle 16 is used to target the object 10. The light vehicle 16 may include a small UAV capable of being launched into the air without the use of a runway. Use of such a UAV is tactically desirable in many situations when troops deployed over the landscape are capable of launching the UAV 16 in an area suspected of having objects 10 worthy of targeting.

Figure 2:
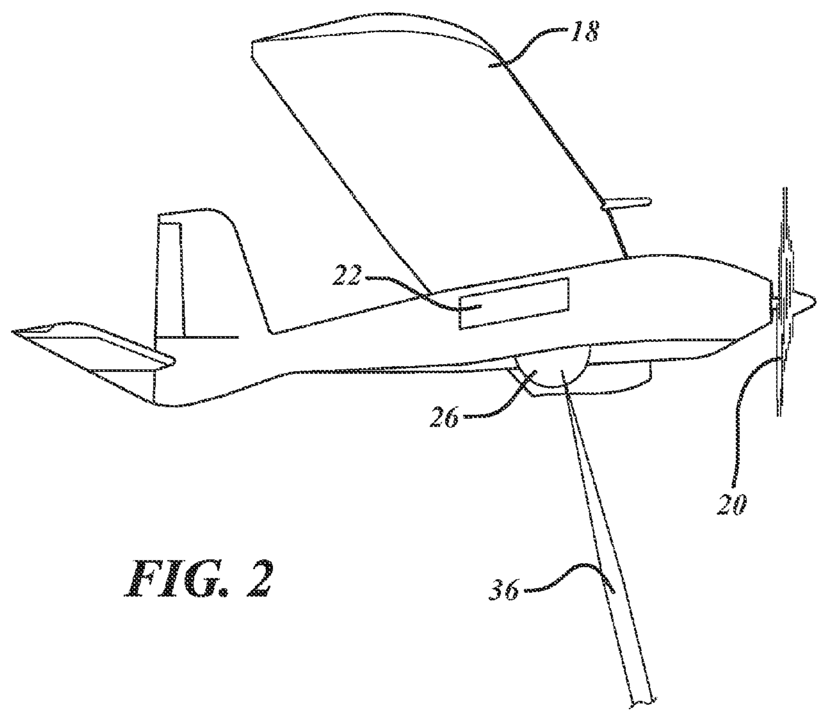
FIG. 2 is a perspective view of a vehicle hosting one embodiment of an illumination assembly.

Referring to FIG. 2, the UAV 16 includes an air foil 18 and a motor driven propeller 20. The UAV 16 hosts a laser 22, which is fixedly secured thereto and immovable with respect to the UAV 16 during the operation of the UAV 16. The laser 22 emits a laser beam of light 24 toward the target object 10. The UAV 16 also hosts an illumination assembly graphically indicated at 26. The illumination assembly 26 is used to guide the laser beam of light 24 onto the targeted object 10 and maintain the laser beam of light 24 on the targeted object 10 while the UAV 16 is in flight. This requires the illumination assembly 26 to be able to maintain its guidance of the laser beam of light 24 onto the targeted object 10 even when the UAV 16 is being buffeted by wind gusts that are more apt to affect a light weight vehicle such as the UAV 16. In one embodiment, the laser 22 is not a part of the illumination assembly 26 and in other embodiments, the laser 22 may be a part of the illumination assembly 26.

Figure 3:
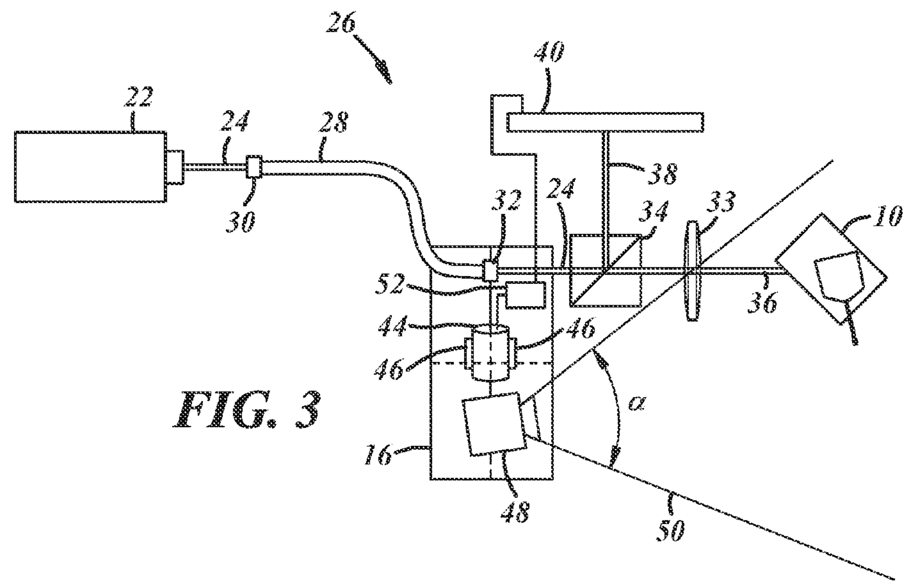
FIG. 3 is a schematic drawing of one embodiment of the illumination assembly.

Referring to FIG. 3, a graphic representation of one embodiment of the illumination assembly 26 is generally shown. In this embodiment, the illumination assembly 26 includes the laser 22 that produces the laser beam of light 24. An optical fiber 28 is disposed adjacent the laser 22 and extends through and defines a curved path. Because the optical fiber 28 is flexible, the curved path through which the optical fiber 28 extends is variable, the variations of which will be discussed in greater detail subsequently. The optical fiber 28 extends between a beam receiving end 30 and a beam emitting end 32. The beam receiving end 30 is fixedly secured in a position relative to the laser 22 such that it receives much of the laser beam of light 24. The beam receiving end 30 is coupled such that there is little loss of the laser beam of light 24 at the optical fiber 28. Likewise, the beam emitting end 32 includes an output coupling such that there is very little loss of the laser beam of light 24 as it exits the optical fiber 28. Additionally, a lens 33 or other device with possible optical magnification is positioned to receive the laser light and collimate the light into a parallel beam with varying pointing angle depending on the linear position of the beam end 32. The lens 33 may be a collimating lens or set of lens and may be positioned upstream or downstream with respect to the beam splitter 34.

The illumination assembly 26 also includes a beam splitter 34, which is disposed adjacent the beam emitting end 32 of the optical fiber 28 or the collimation lens 33. The beam splitter 34 splits the laser beam of light 24 into a target beam 36 and a feedback beam 38. The target beam 36 and the feedback beam 38 travel along different paths. The target beam 36 is directed toward the targeted object 10.

Figure 7:
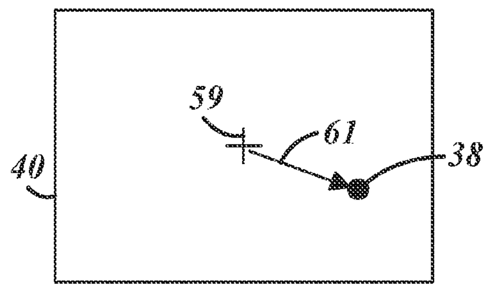
FIG. 7 is a graphic representation of the target beam and feedback beam as imaged by a feedback sensor.

The feedback beam 38 is directed toward a feedback sensor 40, graphically shown in FIG. 7 as a blank screen with a lone circle representing where on the feedback sensor 40 the feedback beam 38 is hitting the feedback sensor 40. The feedback sensor 40 is shown to be blank because it does not need to show any imagery from a camera 48, discussed subsequently. The feedback sensor 40 receives the feedback beam 38 and generates a feedback signal to identify a targeted image portion 42 that is desired to be correlated to the targeted object 10 (the targeted image portion 42 is best seen in FIGS. 6A and 6B). The feedback signal is transmitted to a controller 52, discussed in greater detail subsequently.

The illumination assembly 26 also includes a motor 44 that is operatively connected to the vehicle 16. The beam emitting end 32 of the optical fiber 28 is fixedly secured to the motor 44. The motor 44 is connected to the vehicle or UAV 16 and is operated by the controller 52. The motor 44 may be a two-axis moving coil linear motor that is capable of moving the beam emitting end 32 in two dimensions such that the target beam 36 is capable of maintaining illumination on the targeted object 10 as the targeted object 10 and the UAV 16 move with respect to each other. Movement of the beam emitting end 32 requires the optical fiber 28 to vary the curved path through which it extends. Therefore, the optical fiber 28 is not secured between the beam receiving 30 and beam emitting 32 ends.

The camera 48 transmits an image to a remote viewing screen 47 (FIGS. 6A and 6B). The camera 48 has a defined field of view 50 that extends through a field of view a. The output of the feedback sensor 40 may be superimposed over the video output signal from the camera 48 so that it may be determined where the target beam 36 is directed with respect to the target 10, as imaged by the camera 48. In the instance where the field of view of the camera 48 differs from the feedback sensor 40, mathematical relationships can be used to correlate the two signals to match them to each other, as is known to those skilled in the art.

Referring again to FIGS. 6A and 6B, the targeted image portion 42 is shown in an image 47 created by the camera 48 containing the full field of view 50. Once the targeted object 10 is selected by the operator, the targeted image portion 42 is created and tracked using any effective image processing algorithms (e.g., optical flow of points of interest in target image portion for each successive frame of video). The feedback beam 38 is used to identify the adjustment required by the motor 44 to move the beam emitting end 32 of the optical fiber 28 to move the target beam 36 to maintain its illumination of the target object 10. A frame-by-frame image tracking approach, which is repeated every frame, is shown in FIG. 5, discussed in greater detail subsequently.

Referring to FIG. 5, a block diagram, generally indicated at 74, illustrates how the target 10 is tracked. With the receipt of video input, the controller creates an initial template at 76. Through known techniques, a high info point is created at 78. The target object 10 is matched to the high info point at 80. The template is updated at 82 and a new high info point is created at 84, which is then looped back to match the target object at 80. The output of the target object match 80 is also then sent to update the velocity and position information at 86. The output is transmitted back to the controller 52.

With references to FIGS. 6A, 6B and 7, the controller 52 identifies position changes 51 by measuring changes in the elevation angle 53 and the azimuth angle 55 with respect to a bore sight 57 to identify the difference between what the target beam 36 is pointing at and how far it is from the target 10. FIGS. 6A and 6B show movement of the target 10 relative to the field of view 50 of the camera 48. This movement may be due to movement of the target 10 or a change in position with regard to the UAV 16. Regardless, the target 10 is in a new position with respect to the field of view 50. The controller 52 identifies the change of position 51 with respect to the bore sight 57 as identified by the image processing. Then, as is graphically represented in FIG. 7, the controller 52 moves the target beam 36 by seeing where the feedback beam 38 is within the feedback sensor 40 and moving it so that the feedback beam 38 represents a positional change 61 with respect to the bore sight 59 in the feedback sensor 40 that equals the position change 51 of the target 10 with respect to the bore sight 57 in the image 47. More specifically, the target beam position 36 is correlated to a target image portion 42. This allows the movement of the beam emitting end 32 of the optical fiber when the target image portion 42 and the target beam position 36 are different so that they can be matched, allowing the targeted object 10 to continue to be targeted by the target beam 36. This correction is performed by any fast-response feedback loop using the motor to steer the beam per standard practice with electric motor control.

Figure 4:
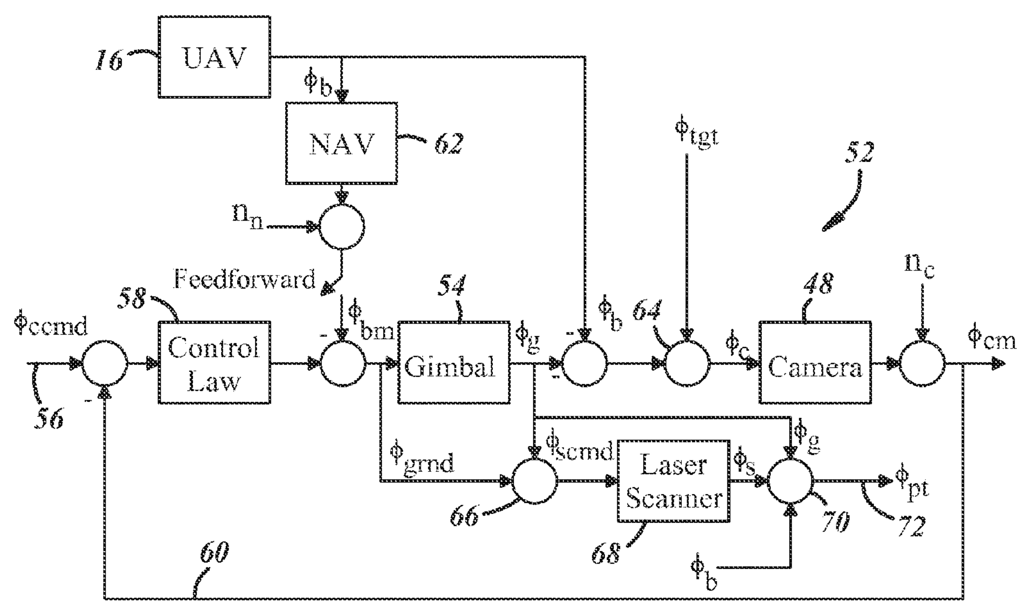
FIG. 4 is a block diagram of the illumination assembly.

Referring now to FIG. 4, a block diagram of one embodiment of the controller 52 is generally shown. This controller 52 shows a more detailed embodiment in which a gimbal 54 is simultaneously being rotated slowly to keep the target in the field of view while the optical fiber 28 is being steered rapidly to keep the target beam 36 on the target 10. The controller 52 receives the feedback signal generated by the feedback sensor 40 and generates a control signal that is transmittable to the motor 44 to position the beam emitting end 32 of the optical fiber 28 such that the target beam 36 continues to be directed toward the targeted object 10.

This example of the controller 52 includes the gimbal 54 operatively connected thereto, wherein the gimbal 54 provides input to the controller 52 relating to the movement of the vehicle 16. In this instance, the motor 44 and camera 48 would be fixedly secured to the gimbal 54 so that they would both move with the gimbal 54. The gimbal 54 is capable of maintaining the targeted object 10 in the field of view 50 of the camera 48 during normal operation of the UAV 16. More specifically, the gimbal 54 is capable of handling the relative movement between the UAV 16 and the targeted object 10. The gimbal 54 is too slow to compensate for sporadic, quick movements of the UAV 16 due to outside environmental factors, such as wind gusts. It should be appreciated by those skilled in the art that the UAV 16 may not be equipped with a gimbal 54, in which case the controller 52 will operate without such input therefrom.

Continuing with reference to FIG. 4, a block diagram of one embodiment of the controller 52 is shown with respect to the UAV 16. It should be noted that this is limited view of the controller 52 as the notations with respect thereto relate only to calculations as they relate to roll of the UAV 16 during a limited time. It should be appreciated by those skilled in the art that similar calculations and notations would be required for pitch and yaw. A command is received at 56 relating to a desired target position in the camera's field of view 50 (a command of zero means the gimbal tries to center the target 10 in its field of view 50). The command is received by a control law 58 after it is compared with a measured target roll angle from a roll feedback loop 60. The control law 58 is a simple PID loop designed to match the gimbal rate limit capability without needlessly saturating the controller 52. The PID loop has a bandwidth near 6 Hz for gimbal steering.

In one embodiment, the gain, phase and delay margins are 14.4 dB, 60 degrees and 27 ms, respectively, wherein the control law 58 is assumed to operate at 100 Hz sample rate or more. The output of the control law 58 is compared with an actual roll measurement of the UAV 16 as calculated by a navigation system 62 such as a GPS. The output of the control law 58 in combination with the body roll as measured by the GPS 62 is received by the gimbal 54 as a gimbal command. The gimbal output and the body roll of the UAV 16 are combined and subtracted from the target roll at junction 64. The combination of the target roll less the UAV body rolls and the gimbal output is the input for the camera 48.

The output of the gimbal 54 is subtracted from the gimbal command adder 66, which becomes an input for a laser scanner 68. As discussed above, the laser scanner includes a fast response feedback loop such that the output of 68 closely follows the input command to 68. An adder 70 combines the body roll of the UAV 16, the output of the laser scanner 68 and the output of the gimbal 54 to generate a final roll pointing angle of the laser beam 36 directed at the target output 72 of the laser 22. The combination of the gimbal command roll angle and commanded laser scanner roll angle compensate for the difference in target line of sight roll relative to the UAV body. The gimbal 54 keeps the target 10 within the laser scanner field of view 50 and the laser scanner 68 does high speed corrections in roll compensating for UAV roll dynamics. By identifying the line of sight target roll angle (the difference between the target depression angle in the roll direction and the UAV body roll angle), the motor 44 may move the beam emitting end 32 of the optical fiber 28 to compensate for the body roll of the UAV 16 so that the target beam 36 will continue to illuminate the target object 10.

Referring to FIGS. 6A and 6B, the targeted image portion 42 is shown in an image created by the image sensor 40 containing the full field of view 50 of the camera 48. Once the targeted object 10 is selected, becoming the targeted image portion 42, it is tracked with respect to the feedback beam 38 to identify the adjustment required by the motor 44 to move the beam emitting end 32 of the optical fiber 28 to move the target beam 36 to maintain its illumination of the target object 10.

Figure 8:
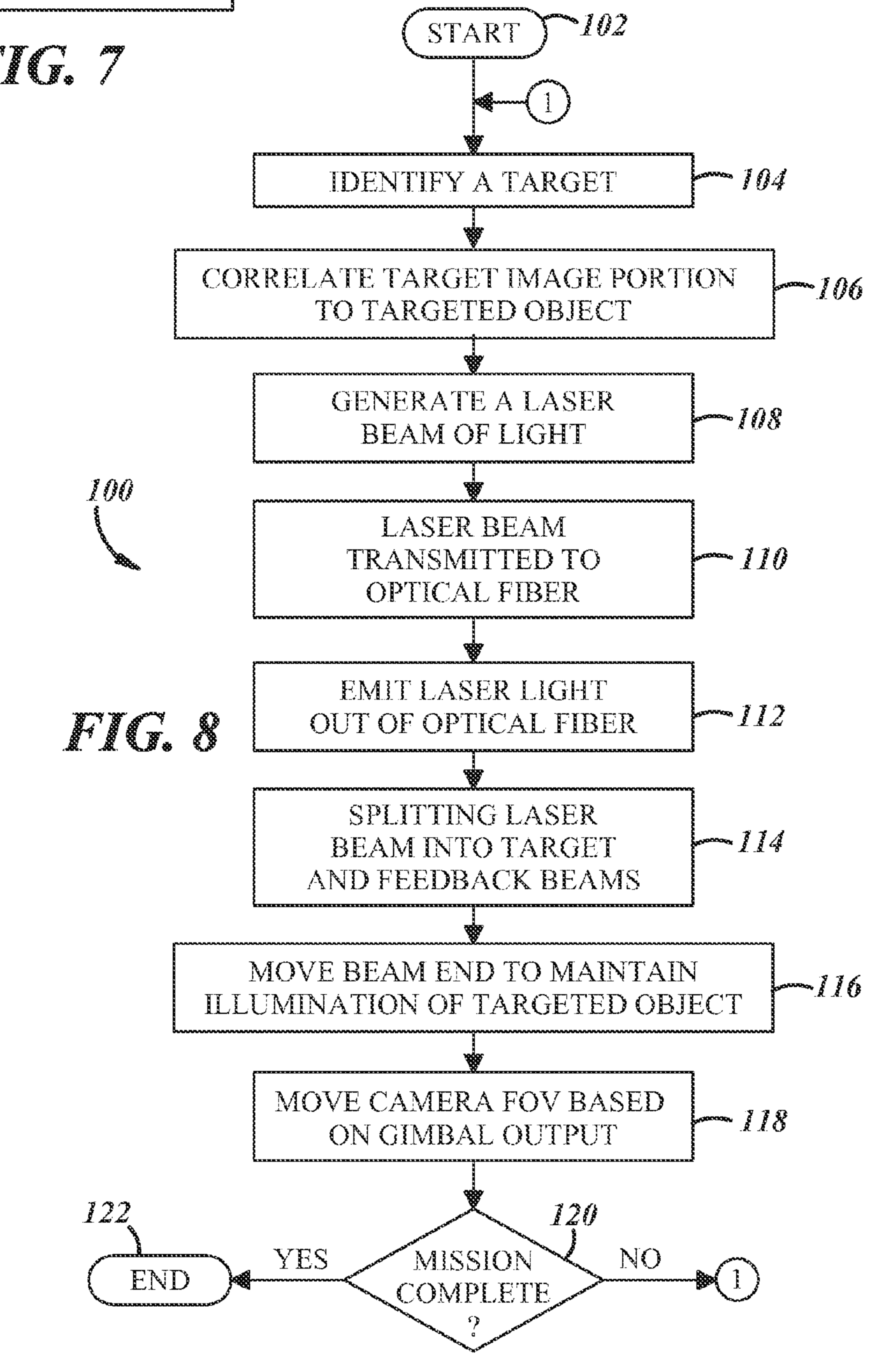
FIG. 8 is a logic chart of one embodiment of a method for illuminating a targeted object.

Referring to FIG. 8, a method for operating the illumination assembly 26 is generally indicated at 100. The method begins at 102. A target image portion 42 of the feedback sensor 40 is identified at 104. The target image portion 42 is correlated to the target object 10 at 106. A laser beam of light 24 is generated at 108. The laser beam of light is transmitted into a beam receiving end of an optical fiber at 110. The laser beam of light 24 is then emitted out from the beam emitting end 32 of the optical fiber 28 at 112. The laser beam of light 24 is then split in a beam splitter into a target beam 36 and the feedback beam 38 at 114. The beam emitting end 32 of the optical fiber 28 is moved at 116 when the target image portion 42 moves on the image sensor 40 such that the target beam 36 continues to be directed at the targeted object 10. When necessary, the camera 48 and the beam emitting end 32 are moved to move the field of view 50 based on movement of the UAV 16, as measured by the gimbal 54 and its output at 118. By doing so this will maintain the targeted image portion 42 in the center or close to the center of the feedback sensor 40 while the UAV 16 and the targeted object 10 move with respect to each other. It is then determined whether the illumination assembly 26 has completed its mission at 120. If not, the method 100 returns to the beginning to maintain the generation of the laser beam of light at 104. If the mission is complete the method is terminated at 122.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An illumination assembly adapted to be mounted to a vehicle for targeting an object, said illumination assembly comprising:

a laser producing a laser beam of light;

an optical fiber disposed adjacent said laser and extending between a beam receiving end for receiving the laser beam of light from said laser and beam emitting end for emitting the laser beam of light therefrom;

a beam splitter disposed adjacent said beam emitting end of said optical fiber, said beam splitter splitting the laser beam of light into a target beam and a feedback beam;

a feedback sensor receiving the feedback beam and generating a feedback signal indicating a point of incidence of the feedback beam in a field of view of the feedback sensor;

a motor operatively connected to the vehicle and fixedly secured to said beam emitting end to move the beam emitting end relative to the feedback sensor;

a controller programmed to command the motor to aim the target beam at a targeted object in response to a targeting input, and further programmed to command the motor to hold the target beam on the targeted object in response to the feedback signal generated by said feedback sensor.

2. An illumination assembly as set forth in claim 1 including a camera having a camera video output with a defined field of view, wherein said field of view is related to said feedback sensor.

3. An illumination assembly as set forth in claim 2 including a collimating lens to collimate the target beam as it exits said beam splitter.

4. An illumination assembly as set forth in claim 3 including a gimbal operatively connected to said controller to provide input to said controller relating to movement of the vehicle.

5. An illumination assembly as set forth in claim 4 including a global positioning system operatively connected to said controller to provide input to said controller relating to movement of the vehicle.

6. An illumination assembly as set forth in claim 5 including a PID loop to work with said gimbal to maintaining the targeted object within said field of view of said camera video output.

7. An illumination assembly as set forth in claim 6 wherein said motor is a two-axis moving coil linear motor.

8. An illumination assembly as set forth in claim 7 including flexures fixedly secured between the vehicle and said motor to suspend said motor.

9. An illumination assembly as set forth in claim 8 wherein said laser is a high speed laser scanner.

10. A method for illuminating a targeted object using a laser mounted to a vehicle, the method comprising the steps of:

directing a camera to create an image including the targeted object;

generating a laser beam of light;

transmitting the laser beam of light into a beam receiving end of an optical fiber;

emitting the laser beam of light out through a beam emitting end of the optical fiber;

splitting the laser beam of light into a target beam and a feedback beam;

transmitting the feedback beam to a feedback sensor to determine a target beam position;

identifying a target image portion in the image;

determining the target beam position relative to the target image portion; and moving the beam emitting end of the optical fiber relative to the feedback sensor such that the feedback beam tracks the target image portion as the target image portion moves relative to the feedback sensor, thereby maintaining a correlation between the target beam position and the target image portion such that the target beam continues to be directed toward the targeted object.

11. A method as set forth in claim 10 including the step of superimposing output of the feedback sensor on an image created by the camera.

12. A method as set forth in claim 10 in which the step of directing a camera to create an image, includes directing a camera that is mounted on a gimbal, and further includes moving the camera such that the camera maintains the target image portion within the image while the vehicle is moving with respect to the target.

13. A method as set forth in claim 12 including the step of collimating the target beam after the step of splitting the beam of light.

* * * * *